Oct. 25, 1949.　　　　G. G. MOSTELLER　　　　2,485,909
ROCKET CARRIER
Filed Dec. 29, 1945　　　　　　　　　　　　　　3 Sheets-Sheet 1

INVENTOR
GERALD G. MOSTELLER
BY G. D. O'Brien
ATTORNEY

Oct. 25, 1949.　　　　G. G. MOSTELLER　　　　2,485,909
ROCKET CARRIER

Filed Dec. 29, 1945　　　　　　　　　　　3 Sheets-Sheet 3

INVENTOR
GERALD G. MOSTELLER

BY　　　　　　　　　ATTORNEY

Patented Oct. 25, 1949

2,485,909

UNITED STATES PATENT OFFICE 2,485,909

ROCKET CARRIER

Gerald G. Mosteller, Los Angeles, Calif., assignor to the United States of America as represented by the Secretary of the Navy Application December 29, 1945, Serial No. 638,392

9 Claims. (Cl. 29—287)

1

This invention relates to rocket carriers and more particularly to a novel device of this character adapted to be removably mounted on a bomb dolly or truck.

One object of the present invention resides in the provision of a rocket carrier which is particularly adapted for use on bomb dollies of the type employed to service airplanes, the rocket carrier being arranged to carry as one load, several aircraft launched rockets.

Another object is to provide a rocket carrier which includes means for clamping simultaneously the heads of several rockets in position for attachment of the rocket bodies so that the rockets may be maintained in a non-propulsive state until ready for loading on the carrier for immediate delivery to the rocket launchers mounted on an airplane.

A further object is to provide a rocket carrier which greatly facilitates assembly of the rockets, insuring proper alinement of the rocket body and rocket head and minimizing the danger of "crossing" the threads which join these two parts of the rocket.

Still another object is to provide a rocket carrier which is adjustable to handle several sizes of rockets.

These and other objects of the invention may be better understood by reference to the accompanying drawings, in which Fig. 1 is a fragmentary side view of one form of the new rocket carrier shown mounted upon a bomb dolly and adjusted to handle larger size rockets;

Figure 1:
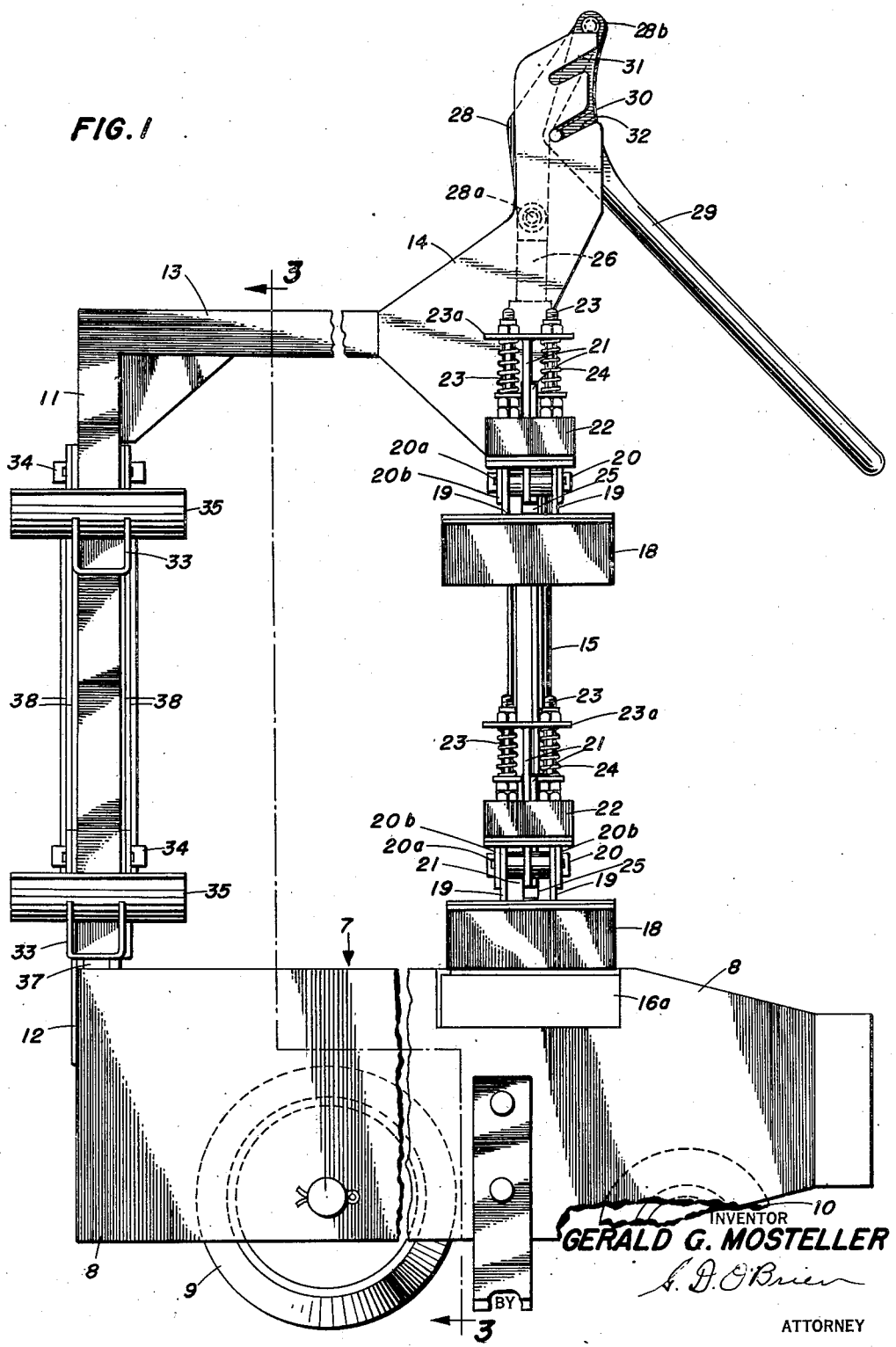
Figure 2:
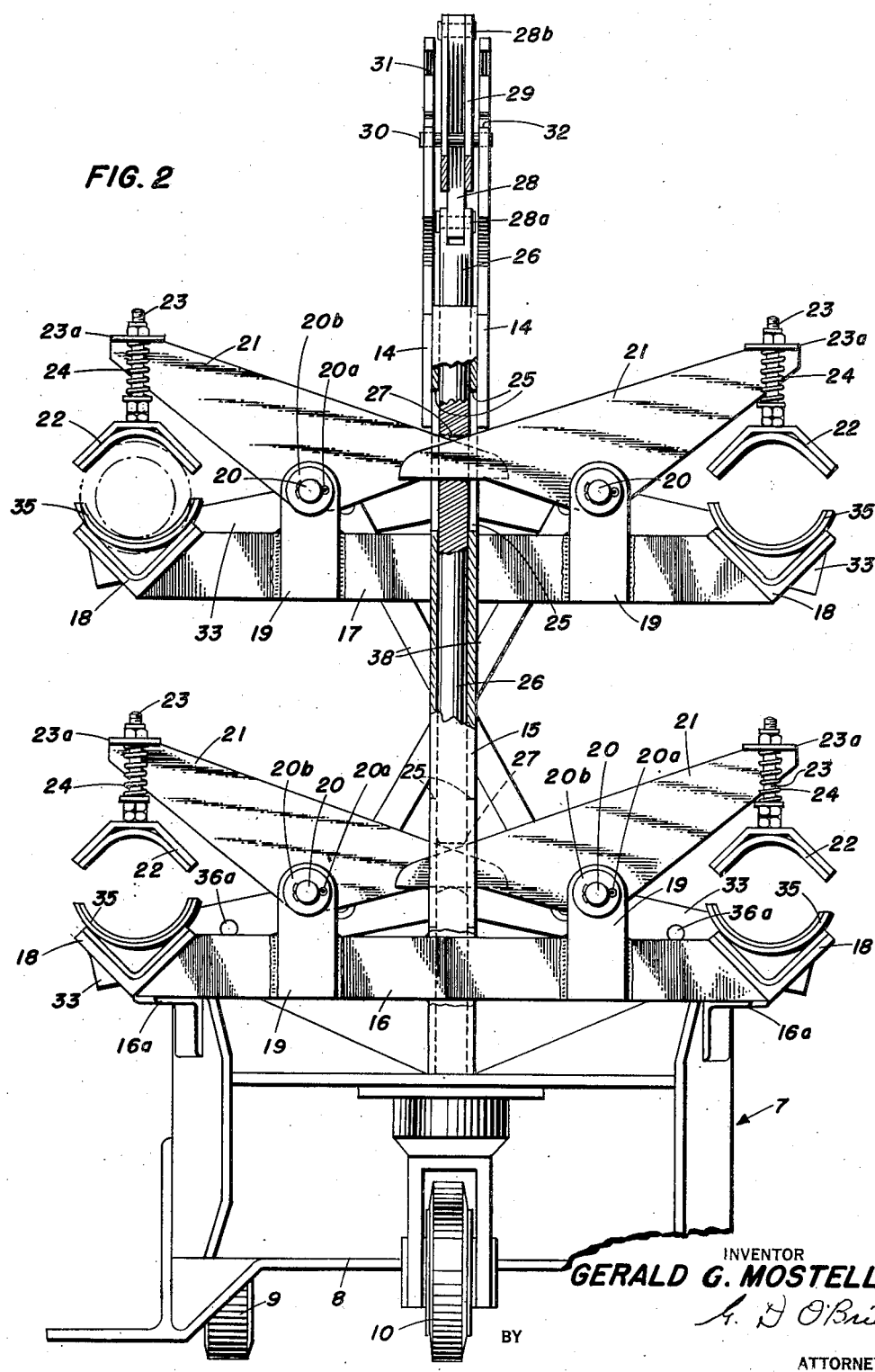
Fig. 2 is a front view of the device illustrated in Fig. 1, with portions shown in section.

The bomb dolly 7, for which the present rocket carrier is adapted, comprises a welded frame structure or base 8 supported by a pair of main wheels 9 and by a steering wheel 10.

The rocket carrier base has longitudinally spaced uprights including a rear post 11 which is secured to the rear end of the dolly frame structure 8 by a gusset plate 12. A longitudinal beam 13 is joined to the upper end of the rear post 11, the forward end of the beam 13 being provided with a pair of gusset plates 14 which secure the beam to the upper end of a forward post 15 constituting the other upright. The lower end of the forward post is secured to the frame structure 8

2 by a lower cross arm 16 which extends laterally of the base and at its extremities rests upon base braces 16a which react to the clamping pressure imposed on the rocket head to prevent flexure or bending of the cross arm 17. About mid-way between the ends of the forward post is an upper cross arm 17.

At the extremities of the cross arms 16 and 17 are short lengths of angle iron disposed so as to form V-channels 18. Each cross arm is provided between each V-channel 18 and the forward post 15 with a pair of upwardly extending brackets 19 which receive a journal pin 20, the pin being held against axial displacement by cotter pins 20a extending through the end portions of the journal pin and engaging washers 20b.

The journal pins 20 fulcrum rocker arms 21. The extended end of each rocker arm supports a clamp jaw 22 which is complementary to an underlying V-channel 18. Each clamp jaw is provided with a pair of upwardly directed stems 23 which extend through a horizontal bracket 23a provided at the overlying extremity of the adjacent rocker arm 21. A spring 24 is coiled around each stem 23 and interposed between the adjacent bracket 23a and clamp jaw 22. The inner or adjacent extremities of the two pairs of rocker arms 21 project through slots 25 provided in the forward post 15. The forward post is hollow and receives a slidable actuating bar 26 having slot 27 therein into which extend the adjacent extremities of the rocker arms 21 for common action thereon by one or the other end of the slot. Vertical movement of the actuating bar in the post 15 causes the rocker arms 21 to fulcrum on the journal pins 20, thereby moving the clamp jaws 22 to or from the V-channels 18.

The upper end portion of the actuating bar 26 extends between the gusset plates 14 and is connected by a link 28 to one arm of an L-shaped lever 29, the ends of the link being joined to the actuating bar and lever by pivots 28a and 28b, respectively. At the juncture of the two legs of the L-shaped lever 29 is a fulcrum pin 30 which is adapted to seat in upper notches 31 or lower notches 32 in the gusset plates 14, thus constituting an itinerant toggle lock. The fulcrum pin is moved from one to the other of the slots, and its insertion is accompanied by a downward movement of the lever which, through its articulations, transfers the lever pressure downwardly upon the jaws 22. In Fig. 1, the fulcrum pin 30 is shown in the lower notch 32 which is the one employed for rocket heads of larger diameter.

Figure 3:
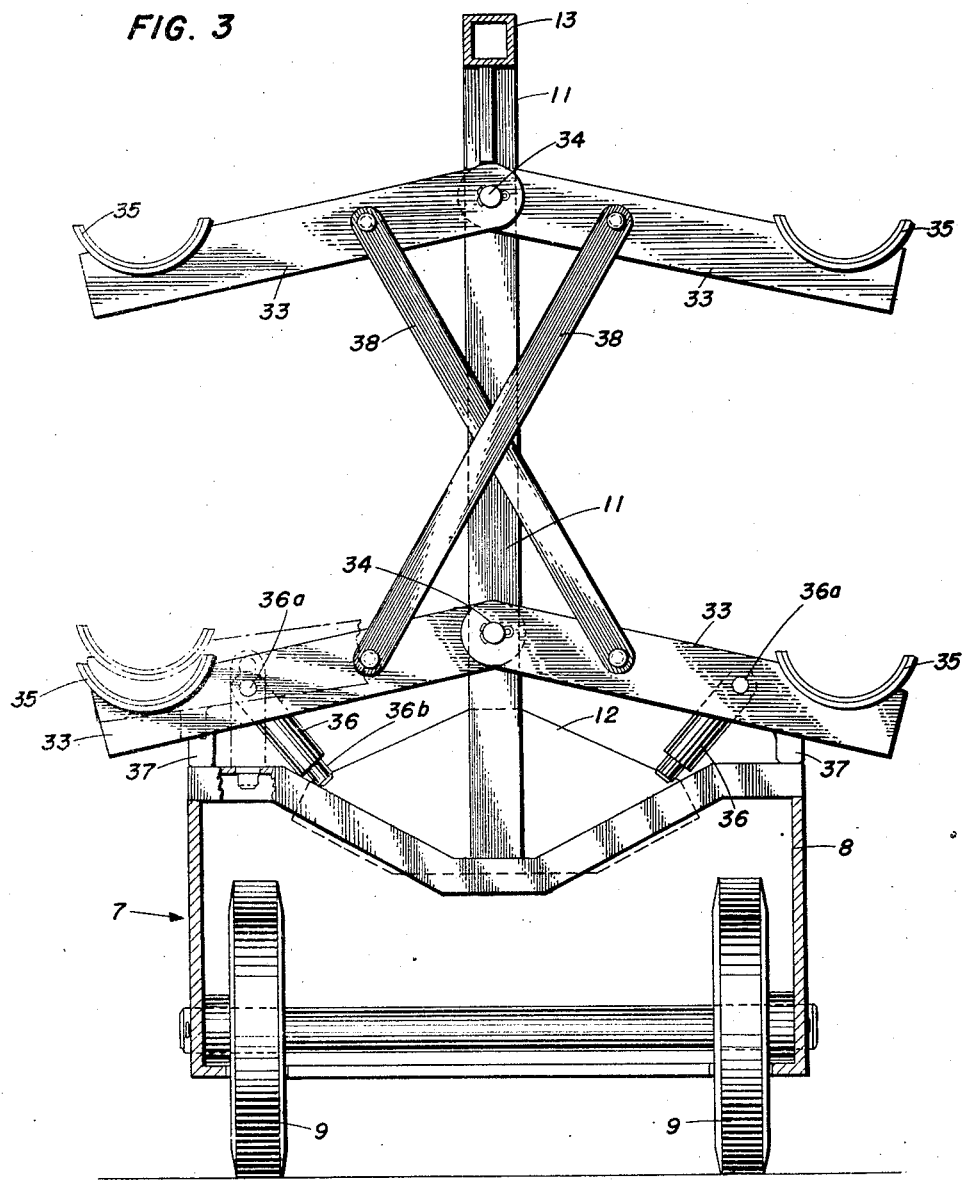
Fig. 3 is a vertical section taken on line 3—3 of Fig. 1, showing by solid lines the adjustment employed for smaller diametered rockets, and by dot-dash lines, the adjustment made for larger diametered rockets.

The rear post 11 is provided with two pairs of laterally extending arms 33 pivotally secured thereto by journal pins 34. The extremities of the arms 33 carry cradles 35 which are adapted to aline longitudinally with the V-channels 18. The lowermost pair of arms 33 is provided with a pair of movable foot members 36 in the form of short levers hinged at 36a to the arms and provided with reduced ends 36b for insertion in holes provided in the frame structure 8. As shown in dot-dash lines in Fig. 3, the movable foot members 36, when vertically disposed, hold the lower arms 33 in predetermined upper positions. By swinging the lower ends of foot members 36 inwardly, the lower arms 33 may be lowered until foot members 37 fixedly carried thereby rest on the frame structure as indicated by full lines in Fig. 3. The lower arms 33 are connected to the upper arms by a pair of tie bars 38 which cross each other. Thus, the upper arms 33 move in unison and to the same extent as the lower arms.

While the carrier may be adapted to various sizes and types of rockets, the particular carrier illustrated is designed to handle 5″ and 3½″ aircraft-launched rockets. The 5″ rocket has a 5″ head and a 3″ motor; whereas, the 3½″ rocket has a 3½″ head and a 3″ motor. The adjustments provided for the arms 33 enable the cradles 35 to engage and support the rocket motor in alinement with either a 5″ or 3½″ rocket head resting in the V-channels 18. That is, when 5″ rocket heads are resting on channels 18, the arms 33 are in their raised positions with the foot members 36 disposed vertically, so that the cradles 35 engage and support the 3″ motors attached to the heads; but when 3½″ rocket heads are used, the arms 33 are in their lower positions on foot members 37, so that cradles 35 engage and support the 3″ motors in the same positions as when the 5″ heads are used. The two sets of notches 31 and 32 permit adjustment of the clamp jaws 22 by hand lever 29 to accommodate the two sizes of rocket heads.

The V-channels 18 and clamp jaws 22 may be lined with friction material, such as leather, in order to provide a firm grip on the rocket head. While the heads are so held the rocket motors may be rotated and screw-threaded into the rocket heads.

The new carrier is of simple construction, holds the rockets securely in position for transport, and is readily adjustable to accommodate different sizes of rockets. By means of the hand lever 29, the actuating rod 26 may be raised or lowered between the two positions corresponding to notches 31 and 32, whereby the clamping jaws 22 are lowered or raised to accommodate two different sizes of rocket heads. When the fulcrum pin 30 is disposed in the notches 31 or 32 corresponding to the size of the rocket heads, the springs 24 are compressed to cause a clamping force between the jaws 22 and the rocket heads. It will be apparent that this clamping force may be relieved, if desired, to facilitate removal of the rockets, by turning the hand lever 29 on its fulcrum pin 30 so as to depress the actuating rod 26.

With the new rocket carrier, the rocket heads and motors may be mounted separately in the channels 18 and saddles 35, respectively, and there connected together by the usual threaded adaptor between the two rocket parts. Since the saddles 35 may be adjusted to hold the rocket motors in axial alignment with their respective rocket heads in the channels 18, the connecting operation is greatly facilitated and may be performed without stripping or "crossing" the connecting threads.

I claim:

1. A rocket carrier comprising a frame structure including a plurality of forward rests and a plurality of corresponding rearward rests, each pair of forward and rearward rests being adapted to receive, respectively, the head and motor of a rocket, multiple clamp means coacting with said forward rests and movable to predetermined settings for given sizes of rocket heads, and means for adjusting the height of said rearward rests to compensate for a disparity in diameter of the motor in respect to the head and to insure the retention of coaxial relationship in the event of a change in the rocket head diameter.

2. In a rocket carrier comprising a frame and an upright integral with the frame, a cross member secured to the upright and having means on at least one end portion thereof for supporting a reclining rocket component, at least one rocker arm pivotally mounted on the cross member, a clamping member on one end of the rocker arm overlying the supporting means and operable to bear down on the reclining rocket component, and an actuating rod slidable in said upright and engageable with the other end of the rocker arm to operate the clamping member.

3. In a rocket carrier comprising a frame and an upright integral with the frame, a cross member secured to the upright and having means on at least one end portion thereof for supporting a reclining rocket component, at least one rocker arm pivotally mounted on the cross member, a clamping member on one end of the rocker arm overlying the supporting means and operable to bear down on the reclining rocket component, an actuating rod slidable in said upright and engageable with the other end of the rocker arm to operate the clamping member, means for actuating the rod, and means for selectively locking the rod in one of plural determined positions corresponding to the particular one of different sizes of rocket components.

4. A rocket carrier comprising a frame, a pair of uprights on the frame, a cross member on one of the uprights having means on the end portions thereof for receiving and supporting rocket heads, a pair of rocker arms on the cross member, a clamp on one end of each rocker arm and engageable with a rocket head on said supporting means, an actuating rod slidable in said one upright and commonly coacting with the other ends of the rocker arms to operate the clamps, a pair of arms pivotally mounted on the other upright, cradles on the end portions of said arms for supporting rocket motors and means for adjusting said arms in respect to the frame to change the elevation of the cradles and accommodate the motors of different sizes of rocket heads receivable by the supporting means.

5. A carrier for co-axially two-girthed objects comprising a frame base having spaced uprights and at least one brace adjoining one upright, a cross member securing said one upright to the frame base of which it is a part and resting on the brace at one end portion thereof, means at said end portion for supporting a component of one girth of a permissible variety of component girths of said object, a rocker arm movably mounted on the cross member, clamping means carried thereby and overlying the supporting means, actuating means for the rocker arm settable on said one upright to plural predetermined positions commensurate with different girths of object components receivable by the supporting means, a pivoted arm swingable at one end on the other upright, a cradle on the other end thereof, and foot members on said pivoted arm of which at least one is fixed and another movable, being individually restable on a part of the frame base to suit changes in axial elevation of the objects when differently sized components are rested on the supporting means.

6. In a carrier for cylindrical objects, supporting means which may be occupied by any one of several sizes of said objects, and quick-change clamp means at once adaptable to any given size of object in the supporting means, said clamp means comprising a jaw confronting the supporting means, an arm movably carrying the jaw, a slidable element connected with the arm, a lever having a swinging connection with said element and having a fulcrum pin, and a plate having notches into one of which the pin is settable to suit said various sizes of objects for fulcrum action of the lever through said element, arm and jaw on the incumbent object.

7. In a carrier for cylindrical objects, supporting means which may be occupied by any one of several sizes of said objects, and quick-change clamp means at once adaptable to any given size of object in the supporting means, said clamp means comprising a jaw confronting the supporting means, a lever having a fulcrum pin, a plate having notches into one of which the pin is settable to suit various sizes of objects, and articulated means connecting the lever with the jaw to transfer the lever pressure developed at a particular notch to the incumbent object.

8. In a carrier for cylindrical objects, supporting means which may be occupied by any one of several sizes of said objects, and quick-change clamp means at once adaptable to any given size of object in the supporting means, said clamp means comprising a jaw confronting the supporting means, a lever having an articulated connection with the jaw, and an itinerant toggle lock for the lever to produce adequate clamping pressure on the incumbent object.

9. In a carrier, a tubular post having diametrically located pairs of slots spaced axially of the post, cross arms attached to the post adjacent the slots, supporting means at the outer ends of the cross arms, each to be occupied by any one of several possible sizes of cylindrical objects, and quick-change clamp means at once and commonly adaptable to all objects of a given size, said clamp means comprising a jaw confronting each of the supporting means for clamping down on the incumbent objects, an element slidable in the post and having slots registering with the slots in the post, arms pivoted on the cross arms, carrying the jaws and having inner ends crossing each other through the registering slots thereby to form a loose joint, a lever having a swinging connection with said element and being wieldable to slide the element for a given setting of the jaws, and means producing a lock for the lever when moved to cause the clamping action at any of the settings.

GERALD G. MOSTELLER.

REFERENCES CITED

The following references are of record in the file of this patent:

UNITED STATES PATENTS

| Number | Name | Date |
|---|---|---|
| 817,513 | Parker | Apr. 18, 1906 |

FOREIGN PATENTS

| Number | Country | Date |
|---|---|---|
| 217,566 | Germany | Jan. 5, 1910 |